Dec. 30, 1930.  R. E. WELLS  1,786,926

ROLLER BEARING

Filed Nov. 17, 1925

INVENTOR
REGINALD E. WELLS,
BY
HIS ATTORNEY.

Patented Dec. 30, 1930

1,786,926

UNITED STATES PATENT OFFICE

REGINALD E. WELLS, OF EAST ORANGE, NEW JERSEY, ASSIGNOR TO GENERAL MOTORS CORPORATION, OF DETROIT, MICHIGAN, A CORPORATION OF DELAWARE

ROLLER BEARING

Application filed November 17, 1925. Serial No. 69,635.

This invention relates to roller bearings and comprises all the features of novelty herein shown, by way of example, as embodied in a bearing having a full series of solid cylindrical rollers.

An object of the invention is to provide a bearing of great simplicity and one that will carry heavy radial and thrust loads, either singly or combined, have no radial play, and be easy to manufacture and assemble.

When the cylindrical rollers of a bearing are long and are under radial load, there is a tendency for them to twist on the raceways, thus localizing the load at the ends of the outer raceway and tending to break the rollers in the middle. When the rollers are short, like discs, thrust load tends to tilt them transversely, thereby straining the cage and localizing pressure and wear at the ends of the rollers and at one end of each raceway. I find that by making the roller diameter about equal to the length, the tendency to twist is much less than in the case of long rollers and the tendency to tilt is much less than in the case of disc rollers, thereby making it feasible to take maximum radial and thrust loads in a narrow bearing without getting either the twist or tilt effect in a degree that is unduly detrimental.

Hitherto, it has been the practice to have cylindrical roller surfaces project to or beyond the raceway surfaces, as into a recess provided for grinding relief. The above referred to localizing of pressure at the ends of the raceways breaks down the raceways at these points and causes them to flake off. I eliminate this disadvantage by making a taper on the rollers of a length greater than that of the grinding relief and thus avoid load pressure on such weaker portions of the race rings. The slight taper further aids in assemblying the bearing and avoids any sharp corners to dig into the raceways. By making the ends of the rollers flat and employing flat thrust faces on flanges of the race rings, I get a surface contact of ample area to sustain heavy thrust load. The slight taper does not materially reduce the end thrust area and it bridges the grinding relief where the latter adjoins the thrust surface of the flange. Relative axial displacement of the race rings does not cause any radial play as in the case of tapered roller bearings. Another object of the invention, therefore, is to provide a roller bearing which will eliminate the above mentioned and other disadvantages and secure the above mentioned and other advantages.

To these ends and also to improve generally upon devices of the character indicated, the invention also consists in the various matters hereinafter described and claimed.

In the drawings, Figure 1 is a side elevation of the bearing.

Figure 1:
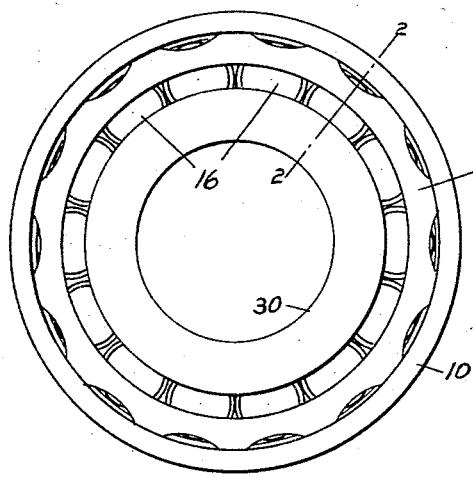
Figure 2:
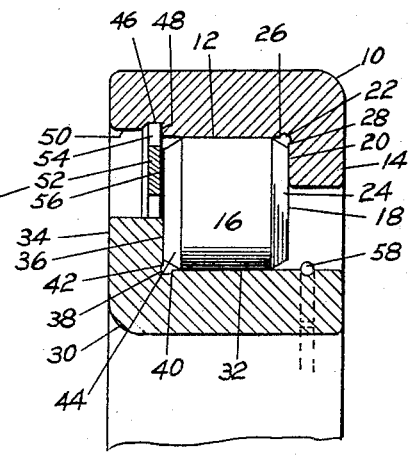
Figure 2 is a section on line 2—2 of Figure 1.

The numeral 10 denotes an outer race ring having a cylindrical raceway 12 and at one end an integral flange 14 extending at right angles to the body of the ring. A full series of solid cylindrical rollers 16 have their cylindrical surfaces engaging the raceway 12 and their flat end faces 18 engaging a flat thrust face or raceway 20 on the flange 14. To avoid a sharp corner and to facilitate grinding, a relief portion 22 is cut at the junction of the raceways 12 and 20 and the roller is provided with a tapered portion 24 which is at least as long as the grinding relief portion 22 so as to bridge the latter across the ends 26 and 28 of the raceway surfaces. This avoids load at these weak ends 26 and 28 of the raceways without decrease in the effective and efficient load area.

An inner race ring 30 has a cylindrical raceway 32 and, at the end opposite flange 14 of the outer race ring, an integral flange 34 extends at right angles to the body of the ring and is provided with a flat thrust face or raceway 36 to engage the flat ends of the rollers. A relief portion 38, extending from the end 40 of the raceway 32 to the end 42 of the thrust face or raceway 36, is bridged by the tapered portion 44 of the rollers to relieve the weak portions of the raceways. The taper of the rollers eliminates sharp corners to dig into the raceways while still leaving ample thrust areas at the ends of the rollers without necessitating long thrust flanges. The taper also facilitates assembly by guiding the rollers and race rings into one another. Preferably the taper is long enough and so placed that the cylindrical surfaces of the rollers terminate short of the ends of their raceways with the end faces of the rollers terminating short of the thrust faces of the end flanges. This supports the raceway surfaces at the points where load pressure is apt to be localized.

Figure 3:
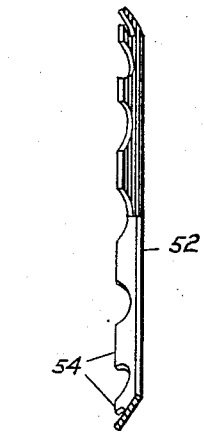
Figure 3 is an edge view and half section of one of the retaining rings before it is secured to the bearing.

At the end of the race ring 10 opposite the flange 14, there is cut a groove 46 terminating at a shoulder 48, a ledge 50 outside the groove having a diameter intermediate between the dimensions of the groove and the outer raceway. A retaining ring 52, having fingers 54 formed by scalloping the outer edge of the ring, is pressed out flat from the original conical shape shown in Figure 3, the final flat face 56 being parallel to the ends of the rollers and the fingers 54 being thereby expanded into the groove 46 inside the ledge 50. The rollers are thus guided and held against axial movement in the outer raceway by the flange 14 and the flat sided ring. On the inner ring, at the end opposite the flange 34, a groove is provided to receive a split retaining ring 58 which is sprung into place to hold the bearing assembled, a space being left between the ring and the ends of the rollers to allow some axial play when desired. Axial play, however, allows no radial play as in the case of tapered bearings.

Figure 4:
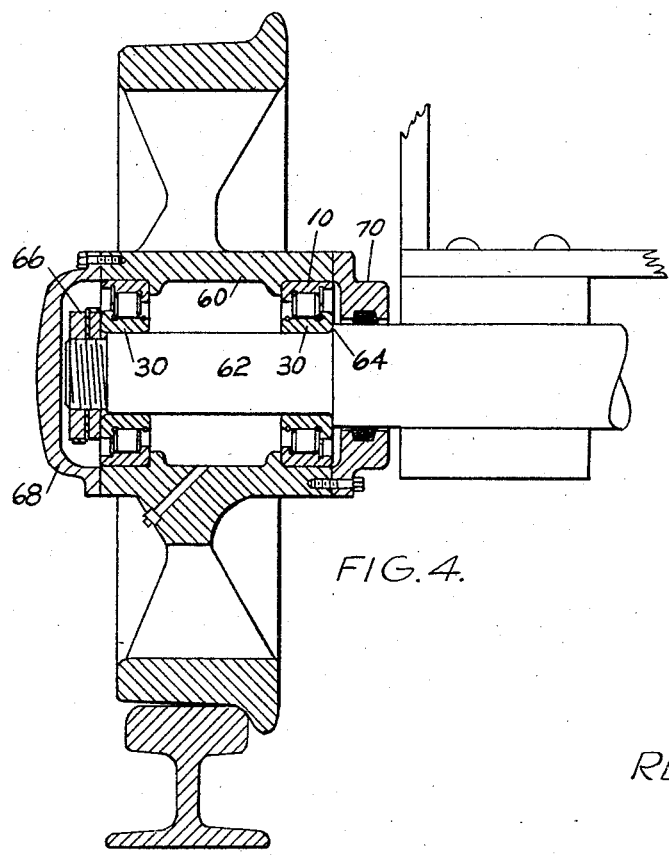
Figure 4 is a central section of a wheel showing the bearings applied.

In Figure 4, the bearings are shown interposed between the hub 60 of a car wheel and its axle 62. One inner race ring 30 abuts a shoulder 64 on the axle and the other is held by nuts 66 threaded on the axle. Each outer race ring 10 abuts a shoulder in the hub and lubricant is retained in the hub by end caps 68 and 70. Such an installation is subject to very heavy but intermittent end thrust shock load which the large flat areas on the rollers and race rings are well able to resist. There is no radial play for different adjustments and hence the lubricant seal in the inner end cap 70 maintains a tight fit with the axle.

I claim:

1. In a roller bearing or the like, a race-member having a bearing-surface, a roller having a cooperating bearing-surface, and means for limiting play of said roller, said race-member being provided with a grinding-relief recess between its said bearing-surface and said limiting means, and said bearing-surface of said roller ending at a point short of said recess when said roller is at the limit of play defined by said limiting means, whereby in said position a portion of said bearing-surface of said race-member projects beyond said bearing-surface of said roller, substantially as described.

2. In a roller bearing or the like, a race-member having a portion provided with a bearing-surface, a roller having a cooperating bearing-surface, and an angular portion of said race-member affording a stop for said roller, said race-member having a grinding-relief recess between its said bearing-surface and said angular portion, and said roller being of reduced size for that portion which, when said roller is stopped by said angular portion, spans said recess and extends inwardly beyond the same; substantially as described.

3. In a roller bearing or the like, a race-member having a portion provided with a bearing surface, a roller having a cooperating bearing-surface, and an angular portion of said race-member affording a stop for said roller, said race-member having a grinding-relief recess between its said bearing-surface and said angular portion, and the end of said roller being bevelled for that portion which, when said roller is stopped by said angular portion, spans said recess and extends inwardly beyond the same; substantially as described.

4. In a roller bearing or the like, a race-member having a portion provided with a bearing-surface, a roller having a cooperating bearing-surface, and an angular portion of said race-member having a bearing-surface affording a stop for engagement by the roller-end, said race-member having a grinding-relief recess between its said two portions, and the end of said roller being of reduced size, both diametrically and axially, for that portion which, when said roller-end engages said angular portion, spans said recess and extends beyond both sides of the same; substantially as described.

5. In a roller bearing or the like, a race-member having a portion provided with a bearing-surface, a roller having a cooperating bearing-surface, and an angular portion of said race-member having a bearing-surface affording a stop for engagement by the roller-end, said race member having a grinding-relief recess between its said two portions, and the end of said roller being bevelled for that portion which, when said roller-end engages said angular portion, spans said recess and extends beyond both sides of the same; substantially as described.

6. A roller bearing comprising cooperating annular race-members each of which has a race-surface and a stop-shoulder at one end of the same and has all of its material at the other end of said race-surface included in the space whose closest approach to the cooperating race-member is limited by the axial line of its own said race-surface, said stop-shoulders being axially opposed to each other, a roller between said race-surfaces and said stop-shoulders, each of said race-members also having an annular groove at the end of its race-surface opposite its stop-shoulder, a plate inserted into one of said grooves and lying adjacent to the end of said roller, and a roller-retaining member in the other of said grooves; substantially as described.

7. A roller bearing comprising cooperating annular race-members each of which has an axial portion provided with a race-surface, an integral angular portion at one end of said race-surface and having an inner bearing-face at substantially a right angle to said race-surface, and a grinding-relief recess at the angle between the race-surface and the bearing-face, said angular portions being axially opposed to each other and all of the material of each race-member at the end of its said race-surface opposite its said angular portion being included in the space whose closest approach to the cooperating race-member is limited by the axial line of its own race-surface, a flat-ended roller between said race-surfaces and said angular portions, each end of said roller being of less diameter than the cooperating said bearing-face and bevelled from its end periphery across and inwardly beyond the adjacent said grinding-relief recess when the roller engages said bearing-faces, each said race-member having an annular groove at the end of its race-surface opposite its said angular portion, one of said grooves being closely-adjacent to, and the other spaced from, its associated said race-surface, a guide-plate received in said closely-adjacent groove and overlapping the roller-end, and a roller-retaining member in said other groove; substantially as described.

In testimony whereof I hereunto affix my signature.

REGINALD E. WELLS.